(12) United States Patent
Liang et al.

(10) Patent No.: US 12,204,896 B2
(45) Date of Patent: Jan. 21, 2025

(54) CODE ANALYSIS METHOD AND SYSTEM, AND COMPUTING DEVICE

(71) Applicant: Huawei Cloud Computing Technologies Co., Ltd., Guizhou (CN)

(72) Inventors: Guangtai Liang, Beijing (CN); Xiao Cheng, Shanghai (CN); Shanbin Cheng, Beijing (CN); Lin Li, Beijing (CN)

(73) Assignee: Huawei Cloud Computing Technologies Co., Ltd., Gui'an New District (CN)

( * ) Notice: Subject to any disclaimer, the term of this patent is extended or adjusted under 35 U.S.C. 154(b) by 101 days.

(21) Appl. No.: 18/152,942

(22) Filed: Jan. 11, 2023

(65) Prior Publication Data
US 2023/0168888 A1   Jun. 1, 2023

Related U.S. Application Data

(63) Continuation of application No. PCT/CN2021/103301, filed on Jun. 29, 2021.

(30) Foreign Application Priority Data

Jul. 17, 2020 (CN) .......................... 202010689099.6
Dec. 10, 2020 (CN) .......................... 202011433419.8

(51) Int. Cl.
*G06F 8/75* (2018.01)

(52) U.S. Cl.
CPC .................................... *G06F 8/751* (2013.01)

(58) Field of Classification Search
CPC ....................................................... G06F 8/751
(Continued)

(56) References Cited

U.S. PATENT DOCUMENTS 8,286,132 B2 * 10/2012 Yuan ...................... G06F 40/197
                                                                717/170
10,198,255 B2 * 2/2019 Higginson ............. G06F 16/248
(Continued)

FOREIGN PATENT DOCUMENTS

CN          110990273 A         4/2020

OTHER PUBLICATIONS

Kim, Miryung, et al. "An empirical study of code clone genealogies." Proceedings of the 10th European software engineering conference held jointly with 13th ACM SIGSOFT international symposium on Foundations of software engineering. 2005.pp. 187-196 (Year: 2005).*
(Continued)

*Primary Examiner* — Satish Rampuria

(57) ABSTRACT

In a code analysis method, a code analysis system obtains information about a service scenario that represents an objective of code analysis. The code analysis system generates a code analysis algorithm for the service scenario based on the information about the service scenario. When code analysis needs to be performed, the code analysis system obtains information about source code and object code that are specified by a user, and analyzes similarity between the source code and the object code according to the code analysis algorithm to obtain an analysis result. The similarity between the source code and the object code is analyzed according to the code analysis algorithm generated based on the information about the service scenario, to obtain the analysis result that meets a requirement of the service scenario.

18 Claims, 10 Drawing Sheets

(58) Field of Classification Search
USPC .................................................. 717/120–178
See application file for complete search history.

(56) References Cited

U.S. PATENT DOCUMENTS

| | | | |
|---|---|---|---|
| 10,585,655 B2* | 3/2020 | Gass | G06F 9/44526 |
| 10,783,055 B2* | 9/2020 | Raviv | H04L 51/046 |
| 11,003,444 B2* | 5/2021 | Zhou | G06F 8/72 |
| 2009/0313271 A1 | 12/2009 | Zeidman | |
| 2011/0246968 A1* | 10/2011 | Zhang | G06F 8/751 717/125 |
| 2021/0311705 A1* | 10/2021 | Makkar | G06F 8/33 |
| 2023/0393832 A1* | 12/2023 | Touati | H04L 67/10 |

OTHER PUBLICATIONS

Fischer, Stefan, et al. "Enhancing clone-and-own with systematic reuse for developing software variants." 2014 IEEE International conference on software maintenance and evolution. IEEE, 2014. pp. 391-400 (Year: 2014).*

Nguyen, Hoan Anh, et al. "A study of repetitiveness of code changes in software evolution." 2013 28th IEEE/ACM International Conference on Automated Software Engineering (ASE). IEEE, 2013.pp. 180-190. (Year: 2013).*

Mili, Hafedh, Fatma Mili, and Ali Mili. "Reusing software: Issues and research directions." IEEE transactions on Software Engineering 21.6 (1995): pp. 528-562. (Year: 1995).*

Basili, Victor R. "Viewing maintenance as reuse-oriented software development." IEEE software 7.1 (1990): pp. 19-25. (Year: 1990).*

Sheneamer, Abdullah et al.: "Code clone detection using coarse and fine-grained hybrid approaches", 2015 IEEE Seventh International Conference on Intelligent Computing and Information Systems (ICICIS), IEEE, Dec. 12, 2015, pp. 472-480.

Bansal, Geetika et al.: "Selecting a set of appropriate metrics for detecting code clones", 2014 Seventh International Conference on Contemporary Computing (IC3), IEEE, Aug. 7, 2014, pp. 484-488.

B. S. Baker, "Finding Clones with Dup: Analysis of an Experiment," in IEEE Transactions on Software Engineering, vol. 33, No. 9, pp. 608-621, Sep. 2007, doi: 10.1109/TSE.2007.70720.

Duanjinlong: "Commonly Used Sorting Algorithms and Their Application Scenarios."https://blog.csdn.net/LLL_foever/article/details/105542478. Apr. 15, 2020, total 5 pages.

I. D. Baxter, A. Yahin, L. Moura, M. Sant"Anna and L. Bier, "Clone detection using abstract syntax trees," Proceedings. International Conference on Software Maintenance (Cat. No. 98CB36272), Bethesda, Md, USA, Nov. 20-20, 1998, pp. 368-377, doi: 10.1109/ICSM.1998.738528.

S. Bellon, R. Koschke, G. Antoniol, J. Krinke and E. Merlo, "Comparison and Evaluation of Clone Detection Tools," in IEEE Transactions on Software Engineering, vol. 33, No. 9, pp. 577-591, Sep. 2007, doi: 10.1109/TSE.2007.70725.

Yingnong Dang et al, Dec. 3, 2012. Xiao: tuning code clones at hands of engineers in practice. In Proceedings of the 28th Annual Computer Security Applications Conference (ACSAC "12). Association for Computing Machinery, New York, NY, USA, 369 378. https://doi.org/10.1145/2420950.2421004.

L. Jiang, G. Misherghi, Z. Su and S. Glondu, "Deckard: Scalable and Accurate Tree-Based Detection of Code Clones," 29th International Conference on Software Engineering (ICSE"07), Minneapolis, MN, USA,May 20-26, 2007, pp. 96-105, doi: 10.1109/ICSE.2007.30.

E. Kodhai, S. Kanmani, A. Kamatchi, R. Radhika and B. V. Saranya, "Detection of Type-1 and Type-2 Code Clones Using Textual Analysis and Metrics," 2010 International Conference on Recent Trends in Information, Telecommunication and Computing, Kerala, India, 2010, pp. 241-243, doi: 10.1109/ITC.2010.55.

J. Krinke, "Identifying similar code with program dependence graphs," Proceedings Eighth Working Conference on Reverse Engineering, Stuttgart, Germany, 2001, pp. 301-309, doi: 10.1109/WCRE.2001.957835.

Li, Zhenmin et al."CP-Miner: finding copy-paste and related bugs in large-scale software code." IEEE Transactions on Software Engineering 32 (2006): 176-192.DOI:10.1109/TSE.2006.28. Mar. 1, 2006.

Liu, Chao et al."GPLAG: detection of software plagiarism by program dependence graph analysis." Knowledge Discovery and Data Mining (Aug. 20, 2006). total 10 pages.

C. K. Roy and J. R. Cordy, "NICAD: Accurate Detection of Near-Miss Intentional Clones Using Flexible Pretty-Printing and Code Normalization," 2008 16th IEEE International Conference on Program Comprehension, Amsterdam, Netherlands, 2008, pp. 172-181, doi: 10.1109/ICPC.2008.41.

H. Sajnani, V. Saini, J. Svajlenko, C. K. Roy and C. V. Lopes, "SourcererCC: Scaling Code Clone Detection to Big-Code," 2016 IEEE/ACM 38th International Conference on Software Engineering (ICSE), Austin, TX, USA, Dec. 20, 2015, pp. 1157-1168, doi: 10.1145/2884781.2884877.

J. Svajlenko and C. K. Roy, "BigCloneEval: A Clone Detection Tool Evaluation Framework with BigCloneBench," 2016 IEEE International Conference on Software Maintenance and Evolution (ICSME), Raleigh, NC, USA, Oct. 2-7, 2016, pp. 596-600, doi: 10.1109/ICSME.2016.62.

M. White, M. Tufano, C. Vendome and D. Poshyvanyk, "Deep learning code fragments for code clone detection," 2016 31st IEEE/ACM International Conference on Automated Software Engineering (ASE), Singapore, Sep. 3-7, 2016, pp. 87-98.

P. Wang, J. Svajlenko, Y. Wu, Y. Xu and C. K. Roy, "CCAligner: A Token Based Large-Gap Clone Detector," 2018 IEEE/ACM 40th International Conference on Software Engineering (ICSE), Gothenburg, Sweden, Sep. 2, 2018, pp. 1066-1077, doi: 10.1145/3180155.3180179.

* cited by examiner

CODE ANALYSIS METHOD AND SYSTEM, AND COMPUTING DEVICE

CROSS-REFERENCE TO RELATED APPLICATIONS

This application is a continuation of International Patent Application No. PCT/CN2021/103301, filed on Jun. 29, 2021, which claims priority to both Chinese Patent Application No. 202010689099.6, filed on Jul. 17, 2020, and Chinese Patent Application No. 202011433419.8, filed on Dec. 20, 2020. The disclosures of the aforementioned priority applications are hereby incorporated by reference in their entirety.

TECHNICAL FIELD

This application relates to the field of software development, and in particular, to a code analysis method and system, and a computing device.

BACKGROUND

During software development and maintenance, developers usually directly reuse some code snippets through copy and paste or reuse some code snippets after modification, so that one code file or different code sources have many same or similar code snippets. This process is referred to as a code clone (code clones). The code clone poses a threat to software quality to some extent. For example, in a scenario, the code clone may easily introduce bugs to a software system and distribute the bugs in different code locations. Once a code snippet has a bug or a requirement change, all clone instances need to be synchronously fixed or adjusted. However, due to numerous and scattered code clone instances, high costs of manual maintenance, and easy omission of changes, in a software evolution process, these code clones gradually aggravate software quality deterioration and increase maintenance costs. In various application scenarios, a code analysis algorithm needs to be used to effectively analyze the code clones.

Currently, fixed features and methods are often used for code clone analysis, and an obtained analysis result cannot meet an actual requirement.

SUMMARY

This application discloses a code analysis method and system, and a computing device. An analysis result obtained according to the code analysis method can meet an actual service requirement of a user.

According to a first aspect, this application provides a code analysis method. The method is performed by a code analysis system. The code analysis system first obtains information about a service scenario, where the service scenario represents an objective of code analysis; and further generates a code analysis algorithm for the service scenario based on the information about the service scenario. When clone analysis needs to be performed on code, the code analysis system obtains information about source code and object code that are specified by a user, and analyzes a similarity between the source code and the object code according to the code analysis algorithm, to obtain an analysis result.

In the foregoing method, the source code and the object code are not analyzed according to a common code analysis algorithm. Instead, the code analysis algorithm is first generated based on the information about the service scenario, and the source code and the object code are analyzed according to the code analysis algorithm generated based on the information about the service scenario, so that the analysis result that better meets a requirement of the service scenario can be obtained, to improve accuracy and applicability of the analysis result.

In a possible implementation of the first aspect, the generating a code analysis algorithm for the service scenario based on the information about the service scenario includes: recommending an algorithm feature corresponding to the service scenario to the user based on the information about the service scenario; and then generating the code analysis algorithm based on a target algorithm feature confirmed by the user in the recommended algorithm feature.

The algorithm feature corresponding to the service scenario is recommended to the user, and the code analysis algorithm is generated based on the target algorithm feature confirmed by the user, so that the generated code analysis algorithm better meets a requirement of the user in the service scenario.

In a possible implementation of the first aspect, the algorithm feature recommended to the user includes a code analysis feature and a post-processing feature, the code analysis feature represents a type of an analysis policy performed during code analysis, and the post-processing feature represents a type of a post-processing policy that needs to be performed after code analysis. The algorithm feature is recommended and confirmed in two aspects, so that the obtained code analysis algorithm can meet the requirement of the user in the service scenario at a finer granularity level.

In a possible implementation of the first aspect, the algorithm feature corresponding to the service scenario is from a preset feature library, and the preset feature library includes at least one service scenario and a corresponding algorithm feature.

In a possible implementation of the first aspect, the generating the code analysis algorithm based on the target algorithm feature confirmed by the user in the recommended algorithm feature includes: extracting an operator corresponding to the target algorithm feature from a preset algorithm library based on the target algorithm feature confirmed by the user in the recommended algorithm feature; and generating the code analysis algorithm based on the extracted operator corresponding to the target algorithm feature.

In a possible implementation of the first aspect, the obtaining information about a service scenario includes: obtaining information about at least two service scenarios; the generating a code analysis algorithm based on the information about the service scenario includes: generating at least two code analysis algorithms for each service scenario based on information about each service scenario; and the analyzing a similarity between the source code and the object code according to the code analysis algorithm includes: analyzing the similarity between the source code and the object code according to the at least two code analysis algorithms, where the analysis result includes information about a clone pair and information about a service scenario corresponding to the clone pair.

In the foregoing method, code analysis algorithms may be generated for the at least two service scenarios, and the at least two code analysis algorithms are used together to analyze a same group of source code and object code, so that an obtained analysis result can include results obtained by analyzing according to the at least two code analysis algorithms. According to the foregoing method, the user can obtain the analysis result including two required scenarios without performing analysis on a same group of source code and object code twice. In addition, in the analysis result, the user may learn, by using the information about the clone pair and the information about the service scenario corresponding to the clone pair, that a service scenario corresponding to a code analysis algorithm used to obtain each clone pair by analysis. This is greatly convenient for the user.

Optionally, the information about the clone pair may include two code snippets forming the clone pair, location information of a first code snippet in the source code, location information of a second code snippet in the object code, similarity information of the clone pair, and description of a similarity reason of the clone pair.

In a possible implementation of the first aspect, the information about the service scenario includes one or more of the following information: code source tracing analysis, code plagiarism check, duplicate code identification in a code refactoring scenario, code clone defect identification, and code cluster analysis. Information about each service scenario indicates an objective of applying a code analysis algorithm. For example, the code source tracing analysis indicates that a generated code analysis algorithm for a code source tracing analysis scenario is used to identify whether a code block in source code is from object code (for example, code in an open-source code library).

In a possible implementation of the first aspect, the code analysis method further includes: obtaining log information, where the log information is from the process of analyzing the similarity between the source code and the object code according to the code analysis algorithm; and adjusting a correspondence between a service scenario and an algorithm feature in the preset feature library based on the log information.

In the foregoing method, the correspondence between the service scenario and the algorithm feature in the preset feature library is adjusted based on the log information in the code analysis process, so that recommendation of the algorithm feature based on the service scenario by using the preset feature library can be more accurate and better meets a requirement of the corresponding service scenario.

In a possible implementation of the first aspect, the log information includes one or more of the following information: the information about the service scenario, the target algorithm feature, the analysis result, and confirmation information of the user for the analysis result.

In a possible implementation of the first aspect, the obtaining information about a service scenario includes: providing a configuration interface for the user, and receiving information about a service scenario selected or entered by the user on the configuration interface. The information about the service scenario obtained on the configuration interface is more user-friendly.

In a possible implementation of the first aspect, before the analyzing a similarity between the source code and the object code according to the code analysis algorithm, the method further includes: deploying the generated code analysis algorithm for the service scenario in a production environment, and releasing a code analysis service in the production environment.

In the foregoing method, the user may perform code analysis in a manner of the code analysis service, and the generated code analysis algorithm is invoked in the background. This manner is more convenient and user-friendly.

According to a second aspect, this application further provides a code analysis method. The method is performed by a code analysis system and includes: recommending at least one algorithm feature to a user, where each algorithm feature corresponds to at least one operator; generating a code analysis algorithm based on a target algorithm feature confirmed by the user in the algorithm feature; obtaining information about source code and object code that are specified by the user; and analyzing a similarity between the source code and the object code according to the code analysis algorithm, to obtain an analysis result.

In the foregoing method, the algorithm feature is recommended to the user, the code analysis algorithm is generated based on the target algorithm feature confirmed by the user, and the similarity between the source code and the object code is analyzed according to the code analysis algorithm, so that a function of the generated code analysis algorithm better meets a requirement of the user, and a code analysis result obtained according to the code analysis algorithm better meets a requirement of the user.

In a possible implementation of the second aspect, the method further includes: obtaining information about a service scenario, where the service scenario represents an objective of performing code analysis; and the recommending at least one algorithm feature to a user includes: recommending at least one algorithm feature corresponding to the service scenario to the user based on the information about the service scenario. In the foregoing method, the algorithm feature is recommended to the user based on the information about the service scenario, so that the recommended algorithm feature is more targeted. The algorithm feature recommended to the user is provided, and a selection range of the user is reduced, so that the code analysis system is suitable for more users.

In a possible implementation of the second aspect, the algorithm feature includes a code analysis feature and a post-processing feature, the code analysis feature represents a type of an analysis policy performed during code analysis, and the post-processing feature represents a type of a post-processing policy that needs to be performed after code analysis.

In a possible implementation of the second aspect, the algorithm feature corresponding to the service scenario is from a preset feature library, and the preset feature library includes at least one service scenario and a corresponding algorithm feature.

In a possible implementation of the second aspect, the generating a code analysis algorithm based on a target algorithm feature confirmed by the user in the algorithm feature includes: extracting an operator corresponding to the target algorithm feature from a preset algorithm library based on the target algorithm feature confirmed by the user in the algorithm feature; and generating the code analysis algorithm based on the extracted operator corresponding to the target algorithm feature.

In a possible implementation of the second aspect, the obtaining information about a service scenario includes: obtaining information about at least two service scenarios; the generating a code analysis algorithm based on a target algorithm feature confirmed by the user in the algorithm feature includes: generating at least two code analysis algorithms for each service scenario based on the target algorithm feature confirmed by the user in the algorithm feature; and the analyzing a similarity between the source code and the object code according to the code analysis algorithm, to obtain an analysis result includes: analyzing the similarity between the source code and the object code according to the at least two code analysis algorithms, to obtain an analysis result, where the analysis result includes information about a clone pair and information about a service scenario corresponding to the clone pair.

According to the foregoing method, the user can obtain the analysis result including two required scenarios without performing analysis on a same group of source code and object code twice. In addition, the user may learn, by using the information about the clone pair and the information about the service scenario corresponding to the clone pair in the analysis result, that a service scenario corresponding to a code analysis algorithm used to obtain each clone pair by analysis. This improves code analysis efficiency and brings convenience for the user.

In a possible implementation of the second aspect, the information about the service scenario includes one or more of the following information: code source tracing analysis, code plagiarism check, duplicate code identification in a code refactoring scenario, code clone defect identification, and code cluster analysis.

In a possible implementation of the second aspect, the method further includes: obtaining log information, where the log information is from the process of analyzing the similarity between the source code and the object code according to the code analysis algorithm; and adjusting a correspondence between a service scenario and an algorithm feature in the preset feature library based on the log information.

In a possible implementation of the second aspect, the log information includes one or more of the following information: the information about the service scenario, the target algorithm feature, the analysis result, and confirmation information of the user for the analysis result.

In a possible implementation of the second aspect, before the analyzing a similarity between the source code and the object code according to the code analysis algorithm, the method further includes: deploying the generated code analysis algorithm in a production environment, and releasing a code analysis service in the production environment.

According to a third aspect, this application provides a code analysis system, including:
an interaction component, configured to obtain information about a service scenario, where the service scenario represents an objective of code analysis; and
a processing component, configured to generate a code analysis algorithm for the service scenario based on the information about the service scenario, where
the interaction component is further configured to obtain information about source code and object code that are specified by a user; and
the processing component is further configured to analyze a similarity between the source code and the object code according to the code analysis algorithm, to obtain an analysis result.

In a possible implementation of the third aspect, the interaction component is further configured to recommend an algorithm feature corresponding to the service scenario to the user based on the information about the service scenario; and the processing component is configured to generate the code analysis algorithm based on a target algorithm feature confirmed by the user in the recommended algorithm feature.

In a possible implementation of the third aspect, the algorithm feature includes a code analysis feature and a post-processing feature, the code analysis feature represents a type of an analysis policy performed during code analysis, and the post-processing feature represents a type of a post-processing policy that needs to be performed after code analysis.

In a possible implementation of the third aspect, the algorithm feature corresponding to the service scenario is from a preset feature library, and the preset feature library includes at least one service scenario and a corresponding algorithm feature.

In a possible implementation of the third aspect, the processing component is configured to extract an operator corresponding to the target algorithm feature from a preset algorithm library based on the target algorithm feature confirmed by the user in the recommended algorithm feature; and generate the code analysis algorithm based on the extracted operator corresponding to the target algorithm feature.

In a possible implementation of the third aspect, the interaction component is configured to obtain information about at least two service scenarios; and the processing component is configured to generate at least two code analysis algorithms for each service scenario based on information about each service scenario; and analyze the similarity between the source code and the object code according to the at least two code analysis algorithms, where the analysis result includes information about a clone pair and information about a service scenario corresponding to the clone pair.

In a possible implementation of the third aspect, the information about the service scenario includes one or more of the following information: code source tracing analysis, code plagiarism check, duplicate code identification in a code refactoring scenario, code clone defect identification, and code cluster analysis.

In a possible implementation of the third aspect, the interaction component is further configured to obtain log information, where the log information is from the process of analyzing the similarity between the source code and the object code according to the code analysis algorithm; and the processing component is further configured to adjust a correspondence between a service scenario and an algorithm feature in the preset feature library based on the log information.

In a possible implementation of the third aspect, the log information includes one or more of the following information: the information about the service scenario, the target algorithm feature, the analysis result, and confirmation information of the user for the analysis result.

In a possible implementation of the third aspect, the interaction component is configured to provide a configuration interface for the user, and receive information about a service scenario selected or entered by the user on the configuration interface.

In a possible implementation of the third aspect, the processing component is further configured to deploy the generated code analysis algorithm for the service scenario in a production environment, and release a code analysis service in the production environment.

According to a fourth aspect, this application further provides a code analysis system, including:
an interaction component, configured to recommend at least one algorithm feature to a user, where each algorithm feature corresponds to at least one operator; and
a processing component, configured to generate a code analysis algorithm based on a target algorithm feature confirmed by the user in the algorithm feature, where the interaction component is further configured to obtain information about source code and object code that are specified by the user; and the processing component is further configured to analyze a similarity between the source code and the object code according to the code analysis algorithm, to obtain an analysis result.

In a possible implementation of the fourth aspect, the interaction component is further configured to obtain information about a service scenario, where the service scenario represents an objective of performing code analysis; and the interaction component is configured to recommend at least one algorithm feature corresponding to the service scenario to the user based on the information about the service scenario.

In a possible implementation of the fourth aspect, the algorithm feature includes a code analysis feature and a post-processing feature, the code analysis feature represents a type of an analysis policy performed during code analysis, and the post-processing feature represents a type of a post-processing policy that needs to be performed after code analysis.

In a possible implementation of the fourth aspect, the algorithm feature corresponding to the service scenario is from a preset feature library, and the preset feature library includes at least one service scenario and a corresponding algorithm feature.

In a possible implementation of the fourth aspect, the processing component is configured to extract an operator corresponding to the target algorithm feature from a preset algorithm library based on the target algorithm feature confirmed by the user in the algorithm feature; and generate the code analysis algorithm based on the extracted operator corresponding to the target algorithm feature.

In a possible implementation of the fourth aspect, the interaction component is further configured to obtain information about at least two service scenarios; and the processing component is configured to generate at least two code analysis algorithms for each service scenario based on the target algorithm feature confirmed by the user in the algorithm feature; and analyze the similarity between the source code and the object code according to the at least two code analysis algorithms, to obtain an analysis result, where the analysis result includes information about a clone pair and information about a service scenario corresponding to the clone pair.

In a possible implementation of the fourth aspect, the information about the service scenario includes one or more of the following information: code source tracing analysis, code plagiarism check, duplicate code identification in a code refactoring scenario, code clone defect identification, and code cluster analysis.

In a possible implementation of the fourth aspect, the interaction component is further configured to obtain log information, where the log information is from the process of analyzing the similarity between the source code and the object code according to the code analysis algorithm; and the processing component is further configured to adjust a correspondence between a service scenario and an algorithm feature in the preset feature library based on the log information.

In a possible implementation of the fourth aspect, the log information includes one or more of the following information:

the information about the service scenario, the target algorithm feature, the analysis result, and confirmation information of the user for the analysis result.

In a possible implementation of the fourth aspect, the processing component is further configured to deploy the generated code analysis algorithm in a production environment, and release a code analysis service in the production environment.

According to a fifth aspect, this application provides a computing device for code analysis. The computing device includes a processor and a memory. The memory stores computer instructions, and the processor executes the computer instructions, so that the computing device performs the method in the first aspect or any possible implementation of the first aspect or the method in the second aspect or any possible implementation of the second aspect.

According to a sixth aspect, this application further provides a computer-readable storage medium. The computer-readable storage medium stores computer program code. When the computer program code is executed by a computing device, the computing device is enabled to perform the method in the first aspect or any possible implementation of the first aspect or the method in the second aspect or any possible implementations of the second aspect. The computer-readable storage medium includes but is not limited to a volatile memory such as a random access memory, or a non-volatile memory such as a flash memory, a hard disk drive (HDD), or a solid-state drive (SSD).

According to a seventh aspect, this application further provides a computer program product. The computer program product includes computer program code. When the computer program code is executed by a computing device, the computing device is enabled to perform the method provided in the first aspect or any possible implementation of the first aspect or the method provided in the second aspect or any possible implementation of the second aspect. The computer program product may be a software installation package. When the method provided in the first aspect or any possible implementation of the first aspect needs to be used, or the method provided in the second aspect or any possible implementation of the second aspect needs to be used, the computer program product may be downloaded and executed on a computing device.

DESCRIPTION OF EMBODIMENTS

Figure 1:
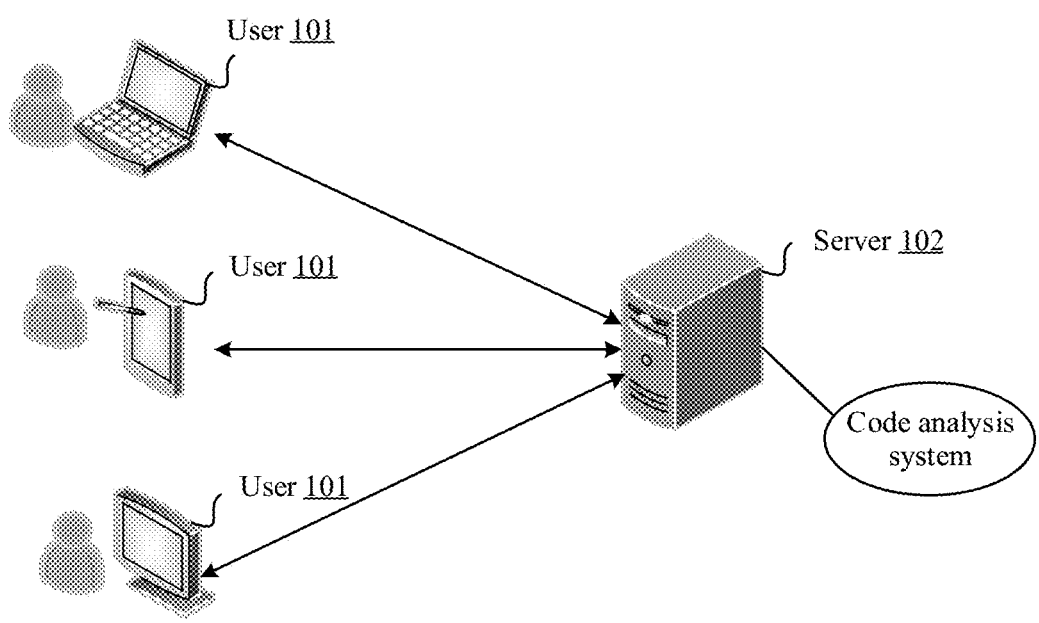
FIG. 1 is a schematic diagram of a system architecture according to an embodiment of this application.

In the industry, a process in which code is simply reused or reused after modification during software development and maintenance, so that a code library or one or more code files contain a plurality of same or similar code snippets is referred to as a code clone (code clone). A same or similar code snippet derived from a code snippet is referred to as clone code of the code snippet.

The code clone may be classified into four types: The first type is to generate one or more code snippets that are the same as a code snippet. The generated clone code differs from the original code snippet only on spaces, layouts, or comments. The second type is to generate one or more code snippets that have a same syntax structure as a code snippet. The generated clone code differs from the original code only on variable names, digits, types, characters, spaces, layouts, and comments. The third type is to generate one or more code snippets that have a similar syntax structure to a code snippet. The generated clone code allows the insertion or deletion of some statements or expressions in addition to difference in variable names, digits, types, characters, spaces, layouts, and comments. The fourth type is to generate clone code that has same semantics as an original code (an output or generation behavior is the same in a specific input scenario) but uses completely different implementation logic or a completely different algorithm.

A code analysis method in this application is intended to generate a code analysis algorithm, and analyze clone code in a code file according to the code analysis algorithm. It should be understood that, in this application, code analysis may also be referred to as code clone analysis, a code analysis service may also be referred to as a code clone analysis service, and a code analysis algorithm may also be referred to as a code clone analysis algorithm.

In the software analysis field, many service scenarios rely on code clone analysis. For example, these application scenarios include the following scenarios: 1. Open-source component source tracing analysis scenario: In this scenario, for a to-be-checked software project, code clone analysis is used to automatically analyze an open-source code snippet that is referenced by the project from an open-source community. Open-source component source tracing analysis helps a developer check whether a code snippet cloned from the open-source community complies with an open-source protocol, to identify risks in a timely manner. 2. Code plagiarism check scenario: For example, in an online programming test system, code clone analysis is used to automatically identify and confirm plagiarism problems in homework submitted by different students. 3. Code cluster analysis scenario: When software data is mined, similar code usually needs to be classified and clustered, and then automatic extraction and mining of an advanced model or insight are performed. The clustering of similar code requires the code clone analysis method. 4. Code refactoring scenario: During software refactoring, code clone analysis needs to be performed to identify and extract redundant code snippets in a timely manner to reduce subsequent maintenance costs. 5. Code defect detection scenario: For example, if similar code in software is copied and pasted (copy-paste), automatic detection and warning are performed for revision inconsistency.

It should be understood that the service scenarios in which the code analysis is used are merely examples. Actually, the code analysis may be further used in more service scenarios. This is not limited in this application.

Although different scenarios rely on the code analysis algorithm, functions of the required code analysis algorithm vary based on focuses of the service scenarios. For example, in the code cluster scenario, a similarity can be directly determined based on the text without being too accurate. In the code plagiarism scenario, a variable name in code needs to be regularized, and accurate matching needs to be performed based on an abstract syntax tree. In a scenario of detecting a copying and pasting error in code, the code needs to be abstracted to a greater extent to find a location of suspected copied code. Therefore, in the different service scenarios, a technical solution, feature dimension, and filtering technology used in the code analysis algorithm also change to better support upper-layer application scenarios.

A code clone analysis tool provides only a fixed code analysis algorithm based on a code similarity. Internal algorithm logic is fixed and requirements of different service scenarios cannot be met. As a result, when the code clone analysis tool is used in different service scenarios, clone analysis is inaccurate and an analysis result is not applicable in some service scenarios.

Based on the foregoing problem, this application provides a code analysis system. In some embodiments, the code analysis system may provide a code analysis service for a user. The system may support generating, based on a specific requirement of the user in a service scenario, a code analysis algorithm that matches the service scenario specified by the user, to provide more accurate code clone analysis for the user. In some other embodiments, the code analysis system may also recommend at least one algorithm feature to the user, and generate, based on a target algorithm feature confirmed by the user in the recommended algorithm feature, a code analysis algorithm that meets a user requirement, to provide code clone analysis for the user by using the generated code analysis algorithm. In still another embodiment, the code analysis system may first obtain information about a service scenario, then recommend an algorithm feature corresponding to the service scenario to the user based on the information about the service scenario, then obtain a target algorithm feature confirmed by the user, generate a code analysis algorithm that meets a service requirement of the user, and further provide code clone analysis for the user by using the generated code analysis algorithm.

FIG. 1 is a schematic diagram of a system architecture according to an embodiment of this application. A user 101 performs, through an endpoint computing device, data communication with a server 102 on which a code analysis system runs, to use a code analysis service provided by the code analysis system. The user 101 may access a web (web) client or an application (app) program client through the endpoint computing device (for example, a laptop computer, a tablet computer, a PC computer, or a smartphone), and interact, through the client, with the code analysis system running on the server 102. An app program needs to be downloaded and installed on the endpoint computing device by the user 101 in advance. The app program is usually released by a provider of the code analysis system on an application download platform, and is regularly upgraded and maintained. In another embodiment, the endpoint computing device of the user 101 may also interact, through a command line interface (CLI), with the code analysis system running on the server 102.

It should be understood that the server 102 may be a standalone server or a server cluster including a plurality of standalone servers. When the server 102 is a server cluster, the code analysis system runs on the server cluster in a distributed manner. The server 102 may be a cloud server (for example, a cloud server of a public cloud service provider), an edge server, or a terminal server, or a server cluster including any two or three of the foregoing three types of servers.

Figure 2:
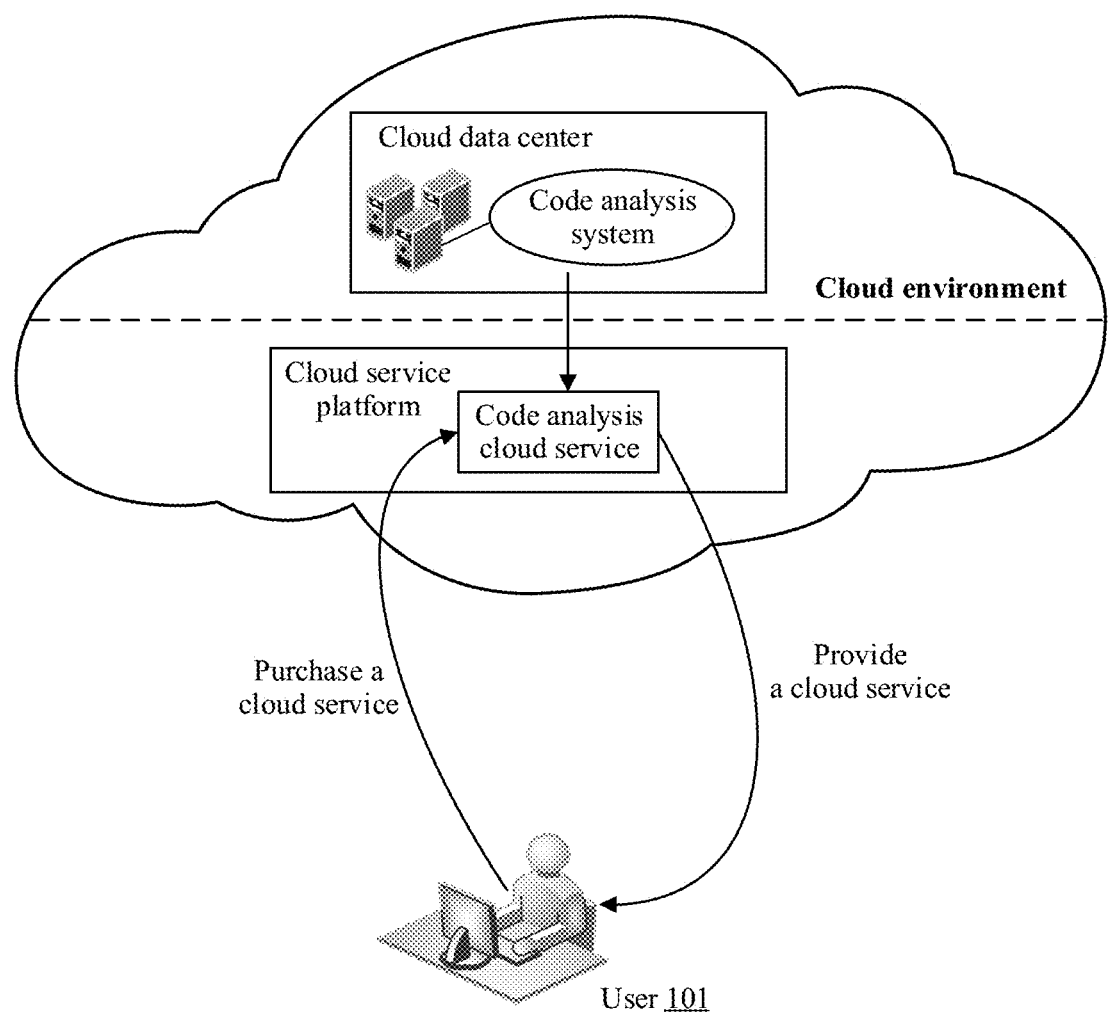
FIG. 2 is a schematic diagram of an application scenario according to an embodiment of this application.

As shown in FIG. 2, in some embodiments, the server 102 may be a cloud server or a cloud server cluster in a cloud data center of a public cloud service provider. The public cloud service provider may provide a code analysis service on a cloud service platform, and the code analysis system running on the server 102 is used to support the cloud service. The user 101 purchases and uses the code analysis service on the cloud service platform by using a web page. The code analysis system receives analysis configuration information and an analysis request of the user 101, and completes code clone analysis for the user 101.

Figure 3:
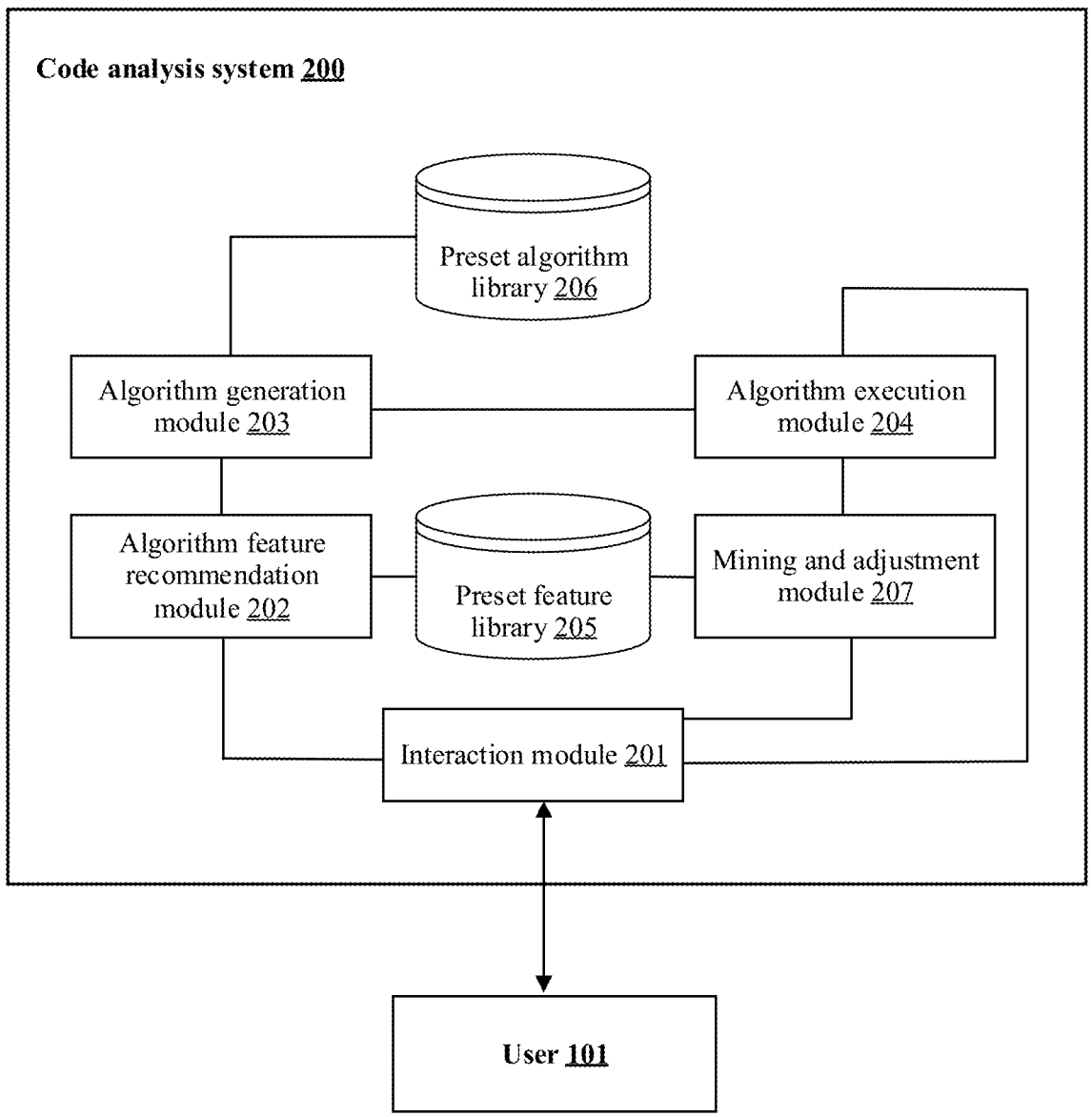
FIG. 3 is a schematic diagram of a structure of a code analysis system 200 according to an embodiment of this application.

FIG. 3 is a schematic diagram of a structure of a code analysis system 200 according to an embodiment of this application. The code analysis system 200 may include an interaction module 201, an algorithm generation module 203, and an algorithm execution module 204. Optionally, the code analysis system 200 further includes an algorithm feature recommendation module 202, a preset feature library 205, a preset algorithm library 206, and a mining and adjustment module 207.

In some embodiments, the interaction module 201 is configured to interact with a user to obtain information about a service scenario entered or selected by the user; or the interaction module 201 is configured to interact with another system or component to obtain information about a service scenario in which code clone analysis needs to be performed. In some embodiments, the interaction module 201 is further configured to provide an algorithm feature recommended by the algorithm feature recommendation module 202 for the user, receive a target algorithm feature confirmed or selected by the user, and send the target algorithm feature to the algorithm generation module 203. In some embodiments, the interaction module 201 is further configured to receive information, such as address information, about source code and object code that are specified by the user and that are used for code clone analysis, and the interaction module 201 is further configured to send the information about the source code and the object code to the algorithm execution module 206. In some embodiments, the interaction module 201 is further configured to provide a code clone analysis result for the user, and receive feedback information of the user on the code clone analysis result.

In some embodiments, the algorithm feature recommendation module 202 is configured to search, based on the obtained information about the service scenario, a preset feature library for an algorithm feature that matches the information about the service scenario in which the user needs to perform code clone analysis, or perform inference by using a pre-trained artificial intelligence (AI) model to obtain an algorithm feature that matches the information about the service scenario in which the user needs to perform code clone analysis, and recommend the algorithm feature to the user with the help of the interaction module 201. When obtaining, in a search-based manner, the algorithm feature that matches the service scenario, the algorithm feature recommendation module 202 may search the preset feature library 205 included in the code analysis system 200. If the code analysis system 200 does not include the preset feature library 205, the algorithm feature recommendation module 202 may also access a feature library in another system to search for a matched algorithm feature.

In some embodiments, the algorithm feature recommendation module 202 is configured to recommend at least one algorithm feature to the user, where the recommended algorithm feature is used as a candidate algorithm feature for selection by the user, the recommended algorithm feature may be from a library maintained in the background, and there is no association relationship between the algorithm feature and the service scenario.

It should be understood that the algorithm feature in this application represents a type of a policy for performing algorithm processing on to-be-analyzed code, and one code analysis algorithm may include a plurality of algorithm features. The algorithm feature may include a code analysis feature and a post-processing feature. The code analysis feature represents a type of an analysis policy performed during code analysis, for example, plain text analysis and comparison, variable name regularization and comparison, comparison after abstraction of variable names, and comparison after blank lines, spaces or comments are filtered out. The post-processing feature represents a type of a post-processing policy that needs to be performed after code analysis. For example, after code similarity calculation is completed based on a code analysis feature, a filter is used to filter code snippets with a high similarity. For example, a filter "Include Filter" indicates that a code snippet containing an include statement in similar code is filtered out, and a filter "Import Filter" indicates that a code snippet containing an import statement in similar code is filtered out. Different algorithm features are used for different service scenarios to generate a code analysis algorithm that is more suitable for the service scenario, to improve accuracy and applicability of an analysis result.

The algorithm generation module 203 is configured to assemble and generate a code analysis algorithm based on the target algorithm feature selected or confirmed by the user. The algorithm generation module 203 extracts an algorithm corresponding to the target algorithm feature from the preset algorithm library 206, and assembles the algorithm with reference to a code clone analysis template, to generate a code analysis algorithm that is sensitive to the service scenario. Optionally, the algorithm generation module 203 is further configured to push and release the generated code analysis algorithm in a production environment, so that a service platform in the production environment can provide a code analysis service for the user according to the code analysis algorithm. The production environment is an environment in which a service is formally provided.

The algorithm execution module 204 is configured to: after the code analysis algorithm is generated, obtain, with the help of the interaction module 201, source code on which the user needs to perform code clone analysis and object code that is used as an analysis reference, execute the code analysis algorithm, determine similar code snippets between the source code and the object code, and generate an analysis result.

The preset feature library 205 is a library that includes a plurality of service scenarios and one or more algorithm features corresponding to the service scenarios. Each service scenario and an algorithm feature corresponding to the service scenario in the preset feature library 205 are used to indicate that in the specific service scenario, code analysis performed according to an algorithm that meets the corresponding algorithm feature can meet a code analysis requirement in the scenario. A correspondence between a service scenario and an algorithm feature in the preset feature library 205 is obtained based on a predetermined rule, historical experience, and/or mining and analysis of analysis results.

The preset algorithm library 206 includes a code clone analysis template and operators corresponding to different algorithm features. The code clone analysis template is a predefined algorithm framework. An executable code analysis algorithm can be generated by filling different modules of the algorithm framework with adapted operators. Each algorithm feature may correspond to a plurality of operators, and each operator is an algorithm that completes a partial function of code clone analysis.

The mining and adjustment module 207 is configured to obtain log information of using the code analysis service by the user, mine an association relationship between a service scenario and an algorithm feature based on the log information, obtain a mining result, and adjust the correspondence between the service scenario and the algorithm feature in the preset feature library 205 based on the mining result.

It should be understood that the code analysis system 200 may include some or all of the function modules, or the code analysis system 200 may play only functions of some or all of the function modules. In different embodiments, the code analysis system 200 may include different function modules.

It should be understood that division into the modules of the code analysis system 200 is merely an example division manner based on functions, and the function module division of the code analysis system 200 is not limited in this application.

Figure 4:
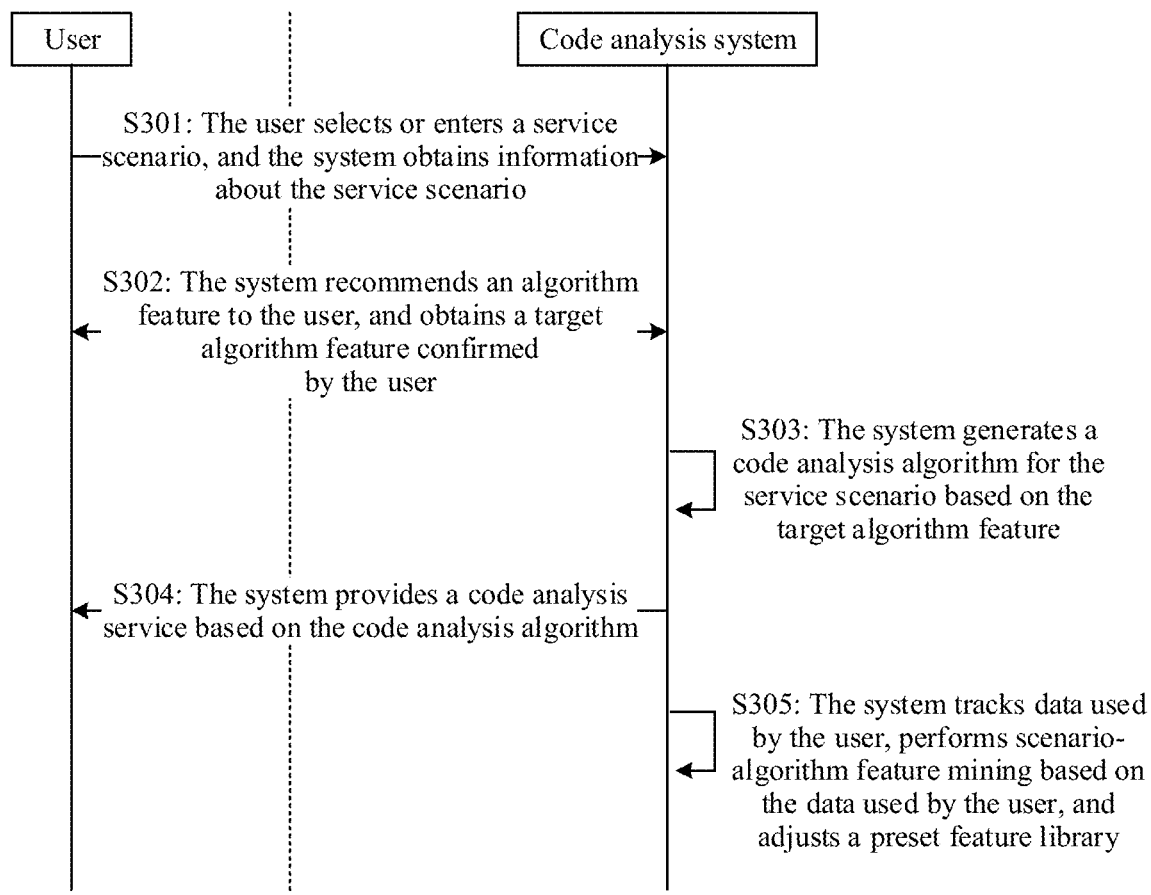
FIG. 4 is a schematic flowchart of code analysis according to an embodiment of this application.

With reference to FIG. 4, the following describes a specific implementation method in which the code analysis system 200 generates a code analysis algorithm and provides a code analysis service according to the code analysis algorithm. In this embodiment of this application, for brevity, "code analysis system" is referred to as "system" for short in some places.

S301: A user selects or enters a service scenario, and the system obtains information about the service scenario.

It should be understood that a manner of interaction between the code analysis system and the user varies with a service mode in which the code analysis system provides a code analysis service. For example, the code analysis system may interact with the user through an interaction interface (for example, a code analysis public cloud service interacts with the user through a web page, and a code clone app interacts with the user through an application interface), or the code analysis system may provide an interface for the user, and interact with the user by invoking the interface. It should be understood that the user who selects the service scenario may be a user who subsequently needs to use the code analysis service, or may be a person who initializes the code analysis system. After the initialization person initializes the code analysis system, the code analysis system may provide the code analysis service for another user.

A specific manner in which the code analysis system provides the code clone analysis service is not limited in this application. In some embodiments of this application, an example in which the code analysis system provides the code analysis service in a manner of a public cloud web service is used for detailed description.

Figure 5:
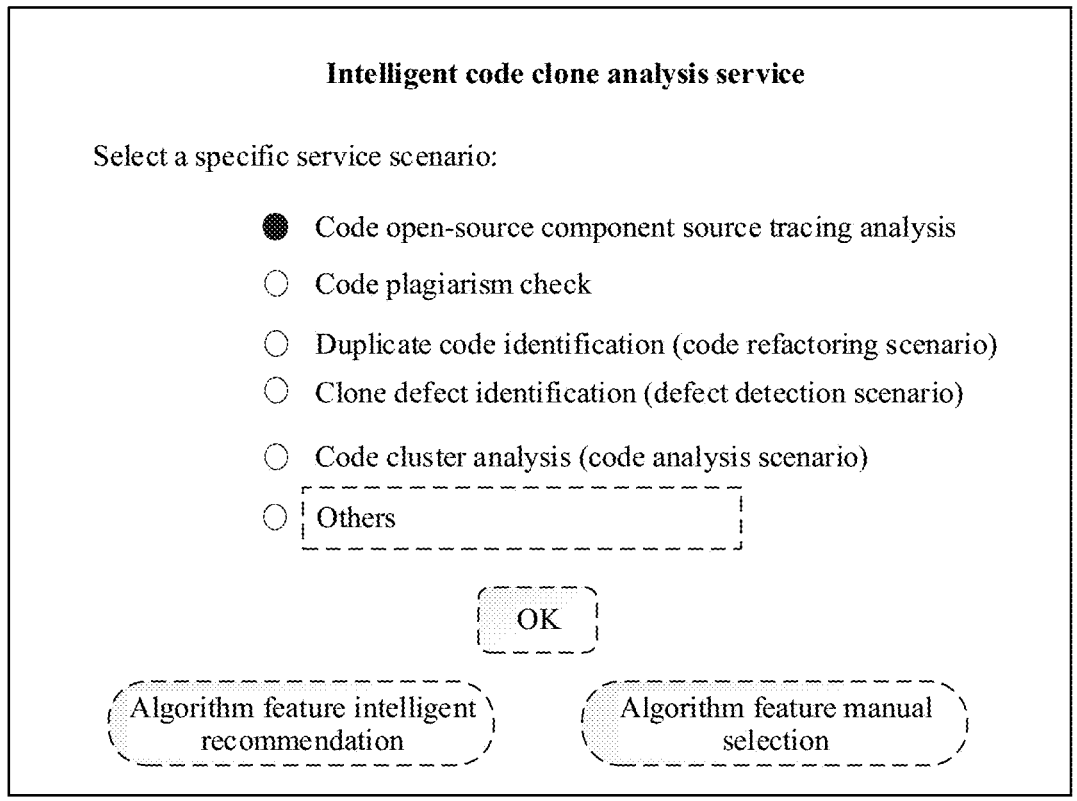
FIG. 5 is a schematic diagram of a service scenario selection interface according to an embodiment of this application.

In a scenario in which the user uses a code analysis service of a public cloud platform, when the user wants to obtain a service scenario-sensitive code clone analysis service, the user first selects or creates a specific service scenario on an interface as required. FIG. 5 is a schematic diagram of a service scenario selection interface. As shown in FIG. 5, a plurality of service scenarios that can be selected by the user are provided, for example, code open-source component source tracing analysis, code plagiarism check, duplicate code identification (code refactoring scenario), clone defect identification (defect detection scenario), and code cluster analysis (code analysis scenario). The user can select one of the scenarios according to an actual requirement. For example, the user selects the code open-source component source tracing analysis scenario in FIG. 5, and may click an OK button on the interface to perform subsequent configuration. Optionally, the interface may also support creating or entering a service scenario by the user. For example, after the user selects an option "Others" on the interface in FIG. 5, the system may provide a service scenario creation page for the user, and the user configures a required new service scenario on the service scenario creation page. The user may also initiatively enter a service scenario on the interface.

After the user determines a specific service scenario, the system obtains information about the service scenario. The information about the service scenario is used by the system to generate a code analysis algorithm for the service scenario.

Optionally, the user may further select, on the service scenario selection interface, whether the system intelligently recommends an algorithm feature. For example, as shown in FIG. 5, when the user clicks a button "Algorithm feature intelligent recommendation", the system intelligently recommends, to the user for further selection or confirmation, algorithm features related to the service scenario selected by the user. When the user clicks a button "Algorithm feature manual selection", the system recommends common algorithm features to the user. In this scenario, the algorithm features recommended by the system are not particularly related to the service scenario, and the user further selects an algorithm feature from the algorithm features recommended by the system.

S302: The system recommends an algorithm feature to the user, and obtains a target algorithm feature confirmed or selected by the user.

S302-1: After obtaining the information about the service scenario, the system may recommend the algorithm feature to the user. As described above, the system may recommend an algorithm feature related to the service scenario to the user based on the fact that the user selects the algorithm feature intelligent recommendation by the system, or automatically recommend an algorithm feature related to the service scenario to the user. Alternatively, the system may automatically recommend a common algorithm feature to the user for selection. The algorithm feature related to the service scenario indicates a type of an algorithm processing policy that may be used when a code analysis algorithm for the service scenario is generated. The common algorithm features may be all algorithm features that are recorded in a library and that can be used for code analysis, or may be a preset quantity of algorithm features that can be used for code analysis.

When the system recommends the algorithm feature related to the service scenario to the user, specifically, after obtaining the information about the service scenario, the system searches a preset feature library for the algorithm feature corresponding to the service scenario based on the information about the service scenario, and then recommends the algorithm feature corresponding to the service scenario to the user. The preset feature library includes a plurality of service scenarios and algorithm features corresponding to the service scenarios. The preset feature library may be a library pre-constructed by the system, or may be a third-party library. An algorithm feature corresponding to each service scenario in the preset feature library represents a type of an algorithm processing policy that may be aggregated by a code analysis algorithm for performing code clone analysis for the service scenario. The preset feature library may be manually constructed based on requirements and experience of scenarios, or may be constructed based on a large amount of historical related information of code analysis algorithms of scenarios by using a big data and/or deep learning technology. The preset feature library in this embodiment of this application may continue to be enriched and updated as the user uses the code analysis service, and details are described subsequently.

S302-2: The user may confirm an algorithm feature recommended by the system, to determine the target algorithm feature, where the target algorithm feature indicates an algorithm feature that needs to be used to subsequently generate a code analysis algorithm.

In the scenario in which the user uses the code analysis service of the public cloud platform, the example in FIG. 5 is still used. When the service scenario selected by the user is code open-source component source tracing analysis, and the user selects "Algorithm feature intelligent recommendation", as shown in FIG. 6, the system recommends an algorithm feature related to the service scenario to the user on a user interface.

Figure 6:
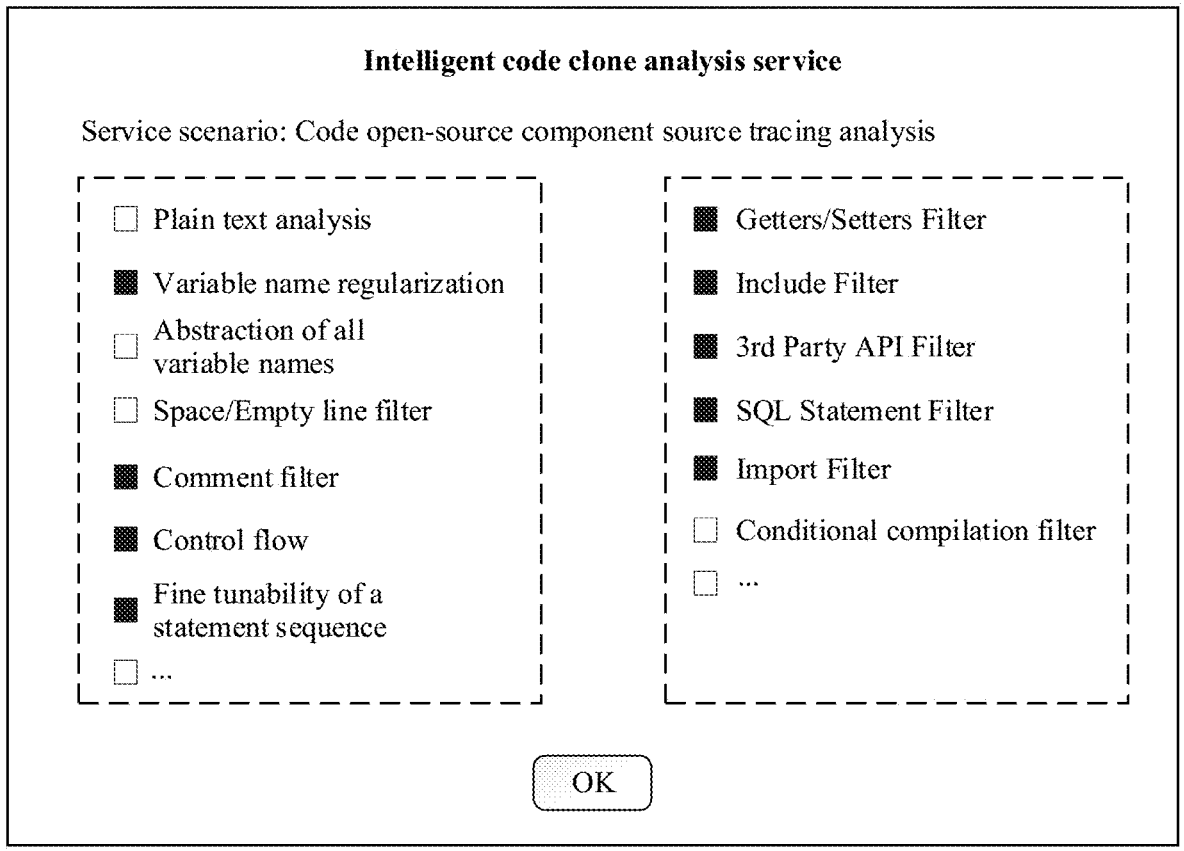
FIG. 6 is a schematic diagram of an algorithm feature recommendation interface according to an embodiment of this application.

In FIG. 6, algorithm features presented on the interface include two types. One type is a code analysis feature, indicating a type of an analysis policy performed during code analysis. The other type is a post-processing feature, indicating a type of a post-processing policy that needs to be performed after code analysis.

There are a plurality of types of code analysis features, for example:
1. Plain text analysis: During code analysis, an abstract structure of code does not need to be considered, and the code is directly considered as common text for feature extraction.
2. Variable name regularization: During code analysis, a variable name in code needs to be regularized for feature extraction, to avoid a code difference caused by reconstruction behaviors such as variable renaming.
3. Abstraction of all variable names: All variable names are abstracted and unified into standard identifiers for feature extraction, to avoid an information difference caused by all variable names.
4. Space/empty line filter: During analysis, a space or an empty line in source code is filtered out, to ignore information differences caused by these factors.
5. Comment filter: During analysis, comment information is filtered out, to ignore an information difference caused by these factors.

Control flow: During analysis, an abstract syntax tree structure of a matched code snippet needs to be extracted based on a code analysis technology, and a control flow graph is constructed. A feature is extracted based on the control flow graph, to implement control-flow-sensitive code similarity calculation.
6. Fine tunability of a statement sequence: indicating that for to-be-matched code, sequences of some statements can be fine-tuned when no semantic difference is caused (for example, after a statement that has no data dependency is adjusted, an execution result is not affected). In this case, it is still considered that the to-be-matched snippets are similar.

It should be noted that the foregoing code analysis features are merely examples, and more code analysis features may be used for recommendation. The code analysis feature is an algorithm feature on an analysis technology side, and is used to limit a feature to be selected by the system to perform feature extraction on a source code snippet, to support subsequent code similarity calculation and analysis.

There are also a plurality of types of post-processing policies, for example:
1. Getters/Setters Filter: indicating to filter out a clone analysis result of code containing a getters/setters method (the code has simple functions and forms, and a similarity of the code is not important in some scenarios and the code can be directly filtered out).
2. Include Filter: indicating to filter a code snippet containing an include statement.
3. 3rd Party API Filter: indicating to filter out a code snippet containing an invoked statement of an API of a third-party library.
4. SQL Statement Filter: indicating to filter out a code snippet containing an SQL statement.
5. Import Filter: indicating to filter out a code snippet containing an import statement.
6. Conditional compilation filter: indicating to filter out a code snippet containing a conditional compilation statement.

It should be noted that the foregoing post-processing features are merely examples, and more post-processing features may be used for recommendation. The post-processing feature is an algorithm feature on a post-processing technology side, and is used to indicate whether a post-processing technology needs to be added after the system completes code similarity calculation, for example, indicate a filter that is to be added, so as to perform timely post-processing on data in a specific service scenario, and improve accuracy of a final result.

As shown in FIG. 6, the service scenario selected by the user is code open-source component source tracing analysis. The system automatically recommends code analysis features to the user in automatic selection mode. The features include the variable name regularization, the comment filter, the control flow, the fine tunability of a statement sequence, and post-processing features: Getters/Setters Filter, Include Filter, 3rd Party API Filter, SQL Statement Filter, and Import Filter. The user can click an OK button on the interface to confirm that the algorithm features recommended by the system are the target algorithm features. Before confirmation, based on a specific service requirement, the user may also select some other algorithm features on the interface or remove some algorithm features automatically recommended by the system. Then the system receives the selected target algorithm features. It should be understood that a presentation manner of recommendation of the algorithm feature is not limited in this application.

S303: The system generates a code analysis algorithm for the service scenario based on the target algorithm feature confirmed or selected by the user.

Specifically, the code analysis system assembles and generates an algorithm based on the target algorithm feature, a preset algorithm library, and a common code clone analysis template.

The preset algorithm library may be an algorithm library that is preset in the code analysis system or a third-party algorithm library, and the preset algorithm library includes operators corresponding to a plurality of algorithm features. In the preset algorithm library, each algorithm feature may correspond to one or more operators. For example, the algorithm feature is pure text analysis, and the preset algorithm library may include one or more feature extraction operators that can implement pure text analysis. Optionally, the preset algorithm library may include a plurality of independent algorithm libraries. For example, based on a type of an algorithm feature, the preset algorithm library may include a code analysis algorithm library and a post-processing algorithm library. The code analysis algorithm library includes operators corresponding to code analysis features, and the post-processing algorithm library includes operators corresponding to post-processing features.

The common code clone analysis template represents a general implementation framework for a code analysis algorithm. Specifically, the template may include three parts: an indexer (Indexer), configured to extract a feature from to-be-matched object code and establish an index; a scanner (Scanner), configured to extract a feature from to-be-matched source code, and match the feature with the index of the object code; and a filter (Filter), configured to perform a series of filtering for matching and analysis results, to improve effectiveness of the result.

A process in which the code analysis system assembles and generates the code analysis algorithm based on the target algorithm feature, the preset algorithm library, and the common code clone analysis template specifically includes the following steps.

Step 1: Select an operator corresponding to the target algorithm feature from the preset algorithm library based on the target algorithm feature. For example, if the target algorithm feature includes the plain text analysis, a text-based (Text-based) feature extraction operator corresponding to the plain text analysis is selected from the preset algorithm library. If the target algorithm feature includes the variable name regularization, a token-based & variable-sensitive (Token-based & Variable-sensitive) feature extraction operator is selected from the preset algorithm library. If the target algorithm feature includes abstraction of all variable names, a token-based & variable-insensitive (Token-based & Variable-Insensitive) feature extraction operator is selected from the preset algorithm library. If the target algorithm feature includes the space/empty line filter or comment filter, a data-dependency-based (Data-dependency-based) feature extraction operator is selected from the preset algorithm library. If the target algorithm feature includes the fine tunability of a statement sequence, a statement sequence insensitive (Statement sequence insensitive) feature extraction operator is selected from the preset algorithm library.

It should be understood that the preset algorithm library may be a comprehensive algorithm library, or may include a plurality of algorithm libraries. For example, if the preset algorithm library includes the code analysis algorithm library and the post-processing algorithm library, operators corresponding to different types of target algorithm features may be obtained from different algorithm libraries. A corresponding operator is selected from the code analysis algorithm library based on the code analysis feature in the target algorithm feature, and a corresponding operator is further selected from the post-processing algorithm library based on the post-processing feature. Different types of filtering technology operators are built in the post-processing algorithm library, for example, a filter operator (Getters/Setters Filter) for setters/getters code snippets, a filter operator (Include Filter) for include statements, a filter operator (3rd Party API Filter) for invoking of a third-party API, a filter operator (SQL Filter) for SQL statements, a filter operator (Import Filter) for import statements, and a filter operator (Conditional Compilation Filter) for conditional compilation.

After the operator corresponding to the target algorithm feature is obtained, the operator may be orchestrated and assembled, and a code analysis module (which may also be referred to as a code feature extraction module) and a post-processing module (a result filter module) are separately generated. The generated module may be configured to generate a code analysis algorithm. It should be understood that each module is a software logic program, and each module may be run to implement a corresponding code analysis or post-processing function.

Step 2: Perform automatic assembly of a code analysis algorithm based on the code analysis module, the post-processing module, and the code clone analysis template, to generate the code analysis algorithm.

In the code clone analysis template, both the indexer and scanner internally rely on the code analysis module. The indexer extracts a feature from the to-be-matched object code based on the code analysis module, and the scanner extracts a feature from the to-be-matched source code based on the code analysis module. Therefore, the code analysis module is built in frameworks of the indexer and scanner during assembly. The filter and the post-processing module need to be assembled to filter the matching and analysis results. Therefore, the post-processing module is built in a framework of the filter and can be invoked by the filter.

Figure 7:
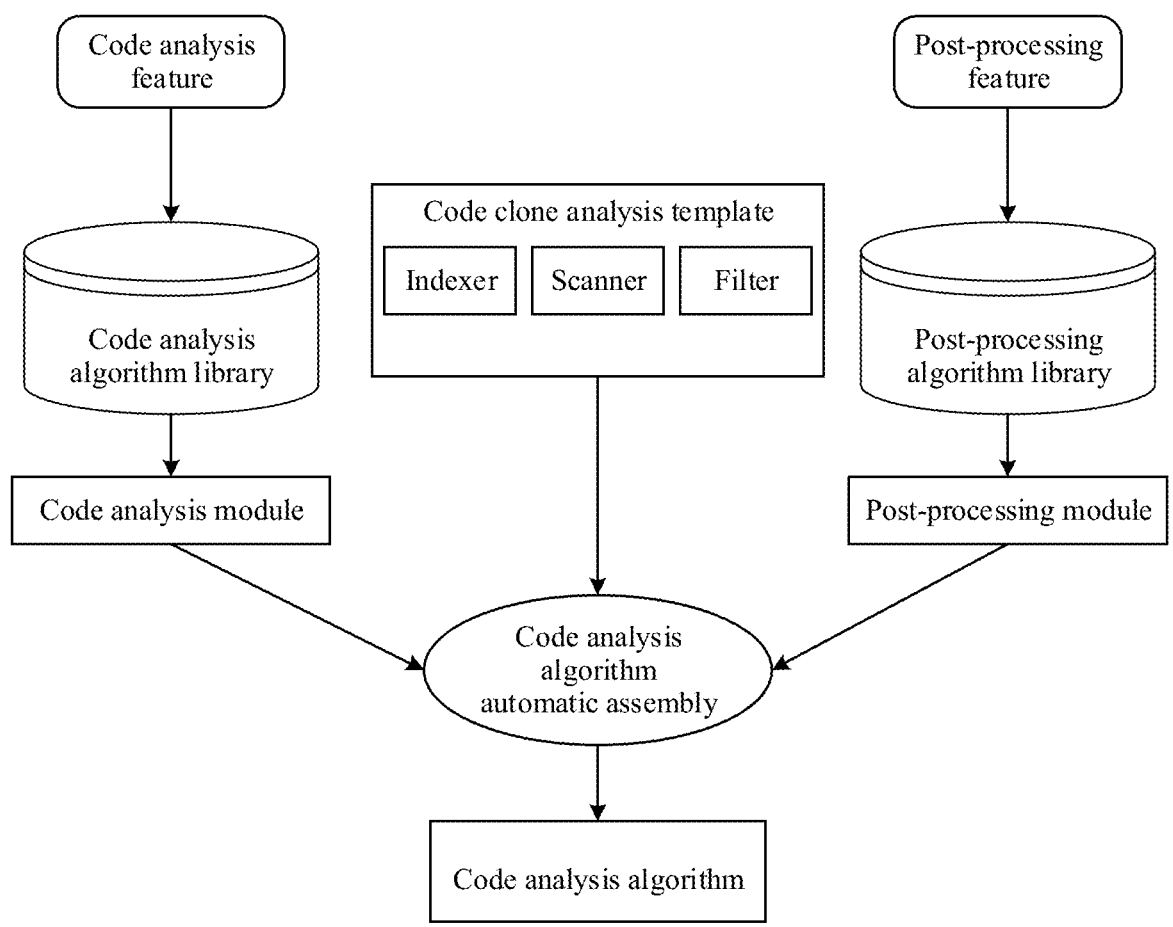
FIG. 7 is an example of an automatic assembly process of a code analysis algorithm according to an embodiment of this application.

The foregoing operator selection and an automatic assembly process of the code analysis algorithm may be represented by using FIG. 7 as an example. In the process in FIG. 7, an example in which the preset algorithm library includes the code analysis algorithm library and the post-processing algorithm library is used.

It should be understood that steps S301 to S303 may also be referred to as an initialization phase of the code analysis system, and the phase is mainly used to generate the code analysis algorithm that can be sensitive to the service scenario selected by the user. The generated code analysis algorithm can be promoted to release to form a scenario-sensitive code analysis service.

S304: Provide a code analysis service according to the code analysis algorithm.

Specifically, the system obtains information about source code and object code that are specified by the user. The system analyzes a similarity between the source code and the object code according to the generated code analysis algorithm, to obtain an analysis result, and provides the analysis result for the user.

Figure 8:
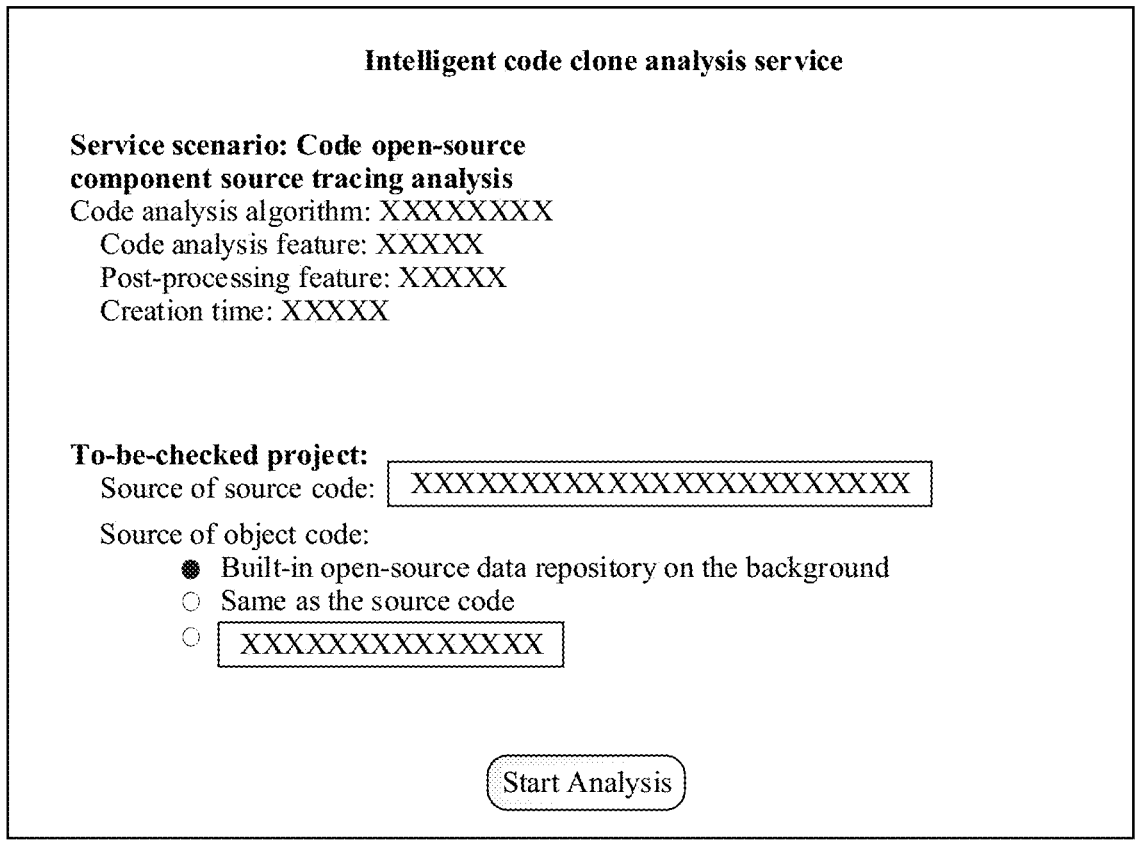
FIG. 8 is a schematic diagram of an interface for specifying source information of source code and object code according to an embodiment of this application.

In some embodiments, the user may use the code analysis service by using a web page, a local client, or invoking through an API interface. An interface access manner is used as an example. On a user interface shown in FIG. 8, after accessing the interface, the user may view currently concerned information about the service scenario and automatically generated code analysis algorithm information (for example, a started code analysis feature, a post-processing feature, and a creation time). On the interface, the user may further specify source information of the to-be-analyzed source code and object code, for example, specify remote git repository path information of a path of a source code repository that includes the source code or a local folder path, and specify path information of an object code repository that includes the object code. In this application, the source code represents code on which code clone analysis is to be performed, and the object code represents reference code during the code clone analysis. Based on a requirement of the service scenario, the object code repository may use a built-in open-source data repository (for example, in an open-source component source tracing analysis scenario) on the background of the system or may be set to be consistent with the source code repository (for example, in a code refactoring scenario and a code defect detection scenario). After the source information of the to-be-matched source code and object code is set, the similarity between the source code and object code can be analyzed according to the code analysis algorithm. For example, the user may click a button "Start Analysis" to start code clone analysis. The code analysis system invokes, according to the assembled code analysis algorithm, the source code and the object code that are specified by the user, and performs code clone analysis.

Figure 9:
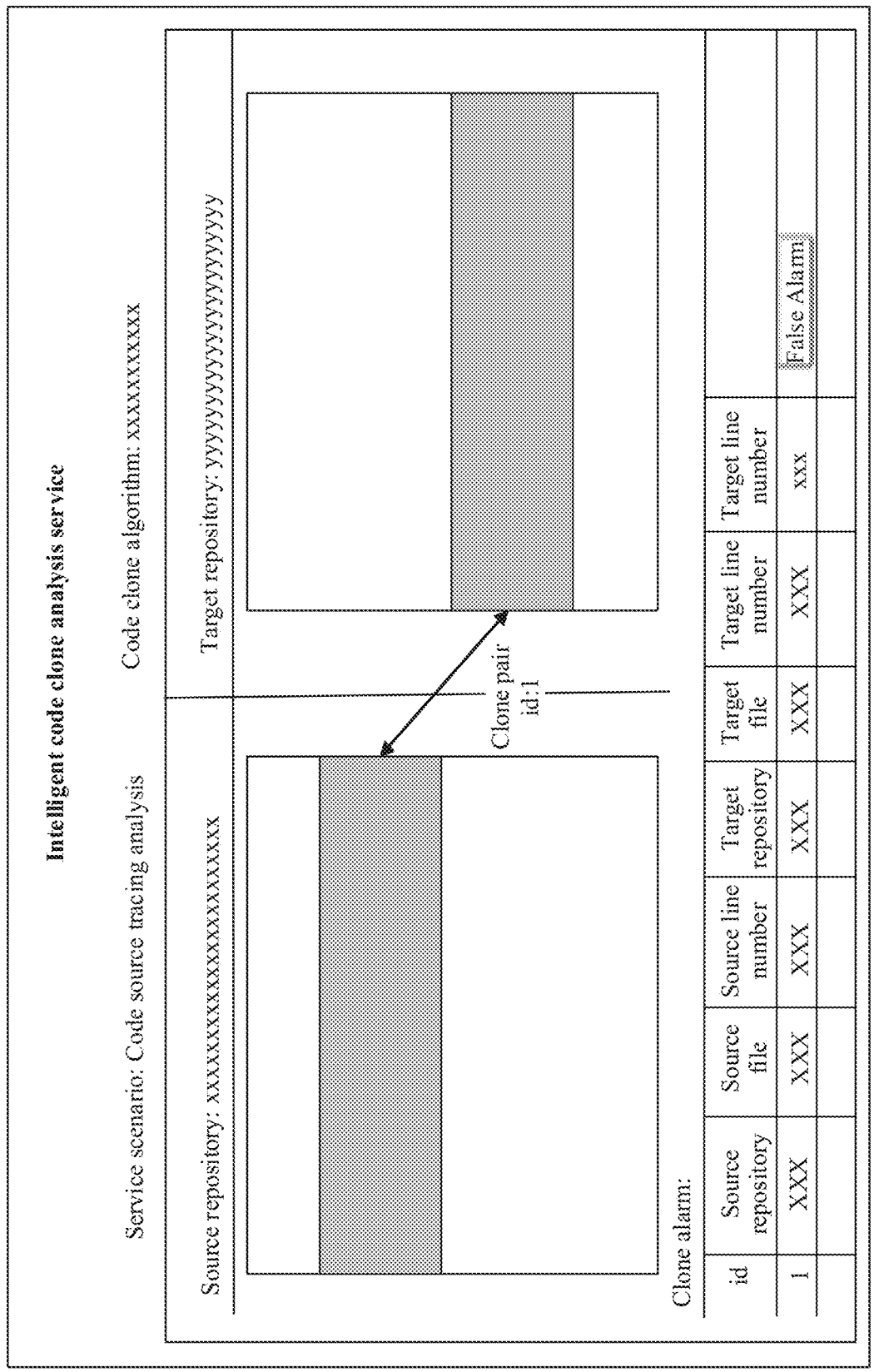
FIG. 9 is a schematic diagram of a presentation interface of a code clone analysis result according to an embodiment of this application.

The system also provides a code clone analysis result for the user. The analysis result may include alarm information and a quantity of clone pairs formed by two similar code snippets, and specific code comparison information of a code clone pair, for example, location information of a first part of code snippet in the source code, location information of a second part of code snippet in the object code, similarity information of the clone pair, and description of a similarity reason of the clone pair. In a scenario in which a service is provided by using an interface, the system displays the analysis result on the interface in real time after the code analysis service is executed. FIG. 9 provides an example of an interface. Alarm information of an identified clone pair is displayed on the interface. The user may click each piece of alarm information to further view specific comparison information of code in a clone relationship. Based on this interface, the user can view alarms and check whether each piece of alarm information is accurate. If alarm information is inaccurate, the user can provide feedback for the system, for example, click a button "False Alarm" on the rear of each line to mark and provide feedback.

S305: When providing the code analysis service, the system continuously tracks data used by the user, continuously performs scenario-algorithm feature mining based on the data used by the user, and adjusts the preset feature library.

Specifically, in a process in which the system provides the code analysis service for the user, the system records information about a service scenario selected by each user, an algorithm feature recommended to the user, a target algorithm feature confirmed by the user, data of a code clone analysis result, code context information related to the analysis result, manual confirmation information of the analysis result, and the like. The system may record the information as log information. The system may use a frequent pattern mining (frequent pattern mining) technology to perform pattern mining on data in the log information, extract an algorithm feature frequently corresponding to each service scenario, and adjust a relationship between a service scenario and an algorithm feature or add a new relationship in the preset feature library based on an extracted scenario-algorithm feature correspondence. The system may periodically mine the foregoing data and adjust the preset feature library, or may trigger the foregoing adjustment when recorded data used by the user exceeds a specific threshold.

It should be understood that S305 is optional. In some cases, for example, when the preset feature library is intelligent enough and accurate enough, there may be no need to mine the data used by the user or adjust the preset feature library. S305 can improve effectiveness and accuracy of intelligent algorithm feature recommendation performed by the code analysis system based on the service scenario.

According to the method for providing the code analysis service described in S301 to S304, the code analysis algorithm that matches the service scenario may be generated based on the service scenario required by the user and the target algorithm feature confirmed by the user in the recommended algorithm feature, and the code analysis service is provided, to improve flexibility of the code analysis service and meet a flexible requirement of the user.

In some other embodiments, the user may further select more than two service scenarios at the same time, and the background recommends an algorithm feature and automatically generate a code analysis algorithm for each service scenario provided by the user. Therefore, the system constructs more than two code analysis algorithms for the user. When the user needs to use the code analysis service, the user can not only select source code and object code, but also select a code analysis algorithm corresponding to a service scenario or code analysis algorithms corresponding to service scenarios. When the user selects a code analysis algorithm corresponding to one service scenario for code analysis, a code analysis process of the system is the same as that in step S304, and details are not described herein again. When the user selects two or more code analysis algorithms for code analysis, the system executes the two or more algorithms in parallel to analyze the source code and the object code. An analysis result obtained according to each algorithm may be provided for the user. For example, a plurality of reports are provided for the user on a plurality of pages, or a plurality of reports are provided separately on one page. The analysis results obtained according to the algorithms may also be integrated to obtain a comprehensive analysis result. The comprehensive analysis result may include alarm information and a quantity of clone pairs, specific code comparison information of the code clone pairs, and a service scenario type of each clone pair. For example, the source code and the object code are analyzed according to two code analysis algorithms A and B for different service scenarios, to obtain three clone pairs in total. The first clone pair is obtained according to the algorithm A, the second clone pair is obtained according to the algorithm B, and the third clone pair is obtained according to both the algorithm A and the algorithm B. A service scenario type of the first clone pair is a service scenario corresponding to the algorithm A, a service scenario type of the second clone pair is a service scenario corresponding to the algorithm B, and a service scenario type of the third clone pair includes the service scenario corresponding to the algorithm A and the service scenario corresponding to the algorithm B.

An embodiment of this application further provides another code analysis method. The method includes the following steps.

S401: A code analysis system obtains information about a service scenario.

For a specific implementation of the step, refer to step S301. Details are not described herein again.

S402: The code analysis system generates a code analysis algorithm for the service scenario based on the information about the service scenario.

A specific method for generating the code analysis algorithm may be that the system finds the generated code analysis algorithm corresponding to the service scenario in the background based on the obtained information about the service scenario. Alternatively, the system obtains, from a preset algorithm library based on the obtained information about the service scenario, an algorithm feature corresponding to the information about the service scenario, finds, based on the corresponding algorithm feature, an operator corresponding to the algorithm feature in the preset algorithm library, and performs assembly based on the obtained operator and a preset code clone analysis template to obtain the code analysis algorithm. For some detailed descriptions of the method, refer to the foregoing process of generating and assembling the code analysis algorithm. Details are not described herein again.

S403: The code analysis system obtains information about source code and object code that are specified by a user, and analyzes a similarity between the source code and the object code according to the code analysis algorithm, to obtain an analysis result.

For the foregoing step, refer to content described in step S304. Details are not described herein again.

Steps S401 to S403 provide a process of generating a service scenario-based code analysis algorithm and performing code analysis according to the generated code analysis algorithm. According to the foregoing method, the user can obtain a code analysis service related to the required service scenario more conveniently.

An embodiment of this application further provides still another code analysis method. The method includes the following steps.

S501: A code analysis system recommends at least one algorithm feature to a user, where each algorithm feature corresponds to at least one operator.

Specifically, the at least one algorithm feature recommended by the code analysis system to the user may be all candidate algorithm features that can be applied to a code analysis algorithm. These algorithm features may be from a library maintained in the background, and these algorithm features may have no association relationship with a service scenario. These algorithm features may also be algorithm features that are related to a service scenario and recommended by the system based on information about the service scenario and a preset feature library.

S502: The code analysis system generates a code analysis algorithm based on a target algorithm feature confirmed by the user in the recommended algorithm feature.

For the foregoing step, refer to content described in step S303. Details are not described herein again.

S503: The code analysis system obtains information about source code and object code that are specified by a user, and analyzes a similarity between the source code and the object code according to the code analysis algorithm, to obtain an analysis result.

For the foregoing step, refer to content described in step S304. Details are not described herein again.

According to the foregoing method, the user may select or confirm the target algorithm feature more flexibly, and the system may generate the code analysis algorithm that better meets a requirement of the user, to improve accuracy and applicability of a code analysis result.

It should be understood that the descriptions of the foregoing embodiments have respective focuses. For a part that is not described in detail in a procedure, refer to related descriptions of another procedure.

Figure 10:
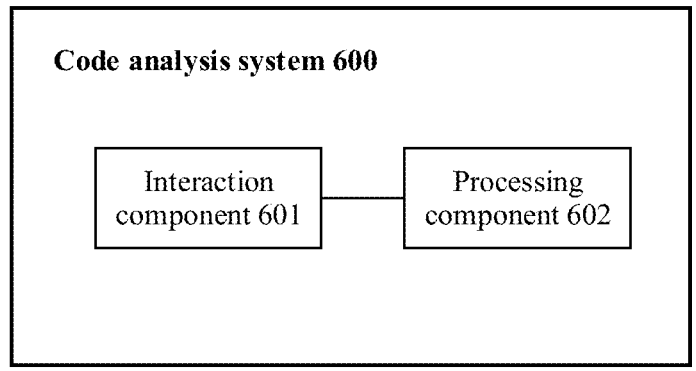
FIG. 10 is a schematic diagram of a structure of another code analysis system 600 according to an embodiment of this application.

An embodiment of this application further provides a code analysis system 600 shown in FIG. 10. The code analysis system 600 includes an interaction component 601 and a processing component 602. Some or all functions of the interaction component 601 may be the same as those of the interaction module 201 in the code analysis system 200. The processing component 602 may perform functions of the algorithm generation module 203 and the algorithm execution module 204 in the code analysis system 200. In some optional cases, the processing component 602 may further perform some or all functions of the algorithm feature recommendation module 202, the mining and adjustment module 207, the preset feature library 205, and the preset algorithm library 206. The code analysis system 600 may perform a part or all of the code analysis method described in steps S301 to S304, or the code analysis system 600 may perform a part or all of the code analysis method described in step S401 to S403, or the code analysis system 600 may perform a part or all of the code analysis method described in steps S501 to S503.

Figure 11:
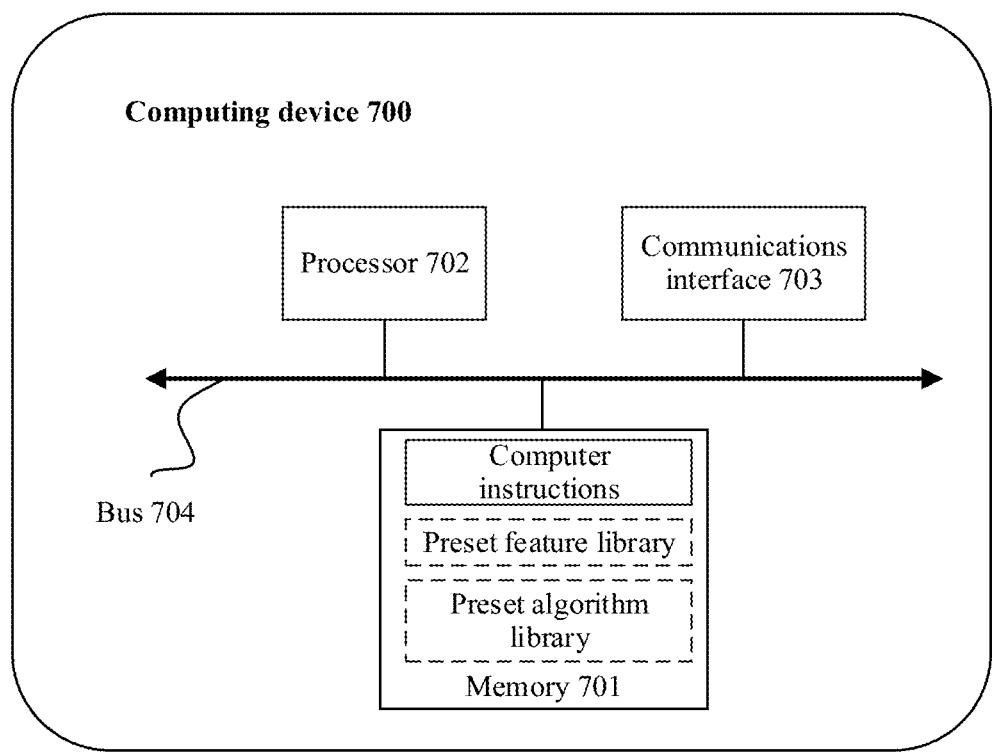
FIG. 11 is a schematic diagram of a structure of a computing device 700 according to an embodiment of this application.

FIG. 11 is a schematic diagram of a structure of a computing device 700. The computing device 700 shown in FIG. 11 may be a computing device or a computing device cluster in a cloud environment or an edge environment, or may be an endpoint computing device. The computing device 700 includes a memory 701, a processor 702, a communications interface 703, and a bus 704. Communication connections between the memory 701, the processor 702, and the communications interface 703 are implemented through the bus 704. It should be understood that a quantity of processors and a quantity of memories in the computing device 700 are not limited in this application.

The memory 701 may be a read-only memory (ROM), a static storage device, a dynamic storage device, or a random access memory (RAM). The memory 701 may store computer instructions. When the computer instructions stored in the memory 701 are executed by the processor 702, the processor 702 and the communications interface 703 perform a part or all of the code analysis method described in steps S301 to S304, or perform a part or all of the code analysis method described in steps S401 to S403, or perform a part or all of the code analysis method described in steps S501 to S503. Optionally, the memory 701 may further store a preset feature library or a preset algorithm library.

The processor 702 may use a general purpose central processing unit (CPU), an application specific integrated circuit (ASIC), a graphics processing unit (GPU), or any combination thereof. The processor 702 may include one or more chips. The processor 702 may include an AI accelerator, for example, a neural processing unit (NPU).

The communications interface 703 uses a transceiver module, for example, but not limited to a transceiver, to implement communication between the computing device 700 and another device or a communications network. For example, the communications interface 703 may be used to obtain information about a service scenario entered or selected by a user and a confirmed target algorithm feature.

The bus 704 may include a path for transmitting information between the components (for example, the memory 701, the processor 702, and the communications interface 703) in the computing device 700.

All or some of the foregoing embodiments may be implemented by using software, hardware, firmware, or any combination thereof. When software is used to implement the embodiments, all or a part of the embodiments may be implemented in a form of a computer program product. The computer program product includes one or more computer instructions. When the computer program instructions are loaded and executed on the computer, the procedure or functions according to embodiments of the present invention are all or partially generated. The computer may be a general-purpose computer, a dedicated computer, a computer network, or other programmable apparatuses. The computer instructions may be stored in a computer-readable storage medium or may be transmitted from a computer-readable storage medium to another computer-readable storage medium. For example, the computer instructions may be transmitted from a website, computer, server, or data center to another website, computer, server, or data center in a wired (for example, a coaxial cable, an optical fiber, or a digital subscriber line) or wireless (for example, infrared, radio, or microwave) manner. The computer-readable storage medium may be any usable medium accessible by the computer, or a data storage device, such as a server or a data center, integrating one or more usable media. The usable medium may be a magnetic medium (for example, a floppy disk, a hard disk, or a magnetic tape), an optical medium (for example, a DVD), or a semiconductor medium (for example, an SSD).

What is claimed is:

1. A code analysis method performed by a code analysis system, the method comprising:
   providing a code analysis service for a user on a cloud service platform, and the code analysis service runs on a cloud server or a cloud server cluster in a cloud data center;
   obtaining information about a service scenario, wherein the service scenario represents an objective of code analysis;
   generating a code analysis algorithm for the service scenario based on the information about the service scenario;
   obtaining information about source code and object code that are specified by the user;
   analyzing a similarity between the source code and the object code according to the code analysis algorithm, to obtain an analysis result;
   wherein the step of generating the code analysis algorithm comprises:
   recommending an algorithm feature corresponding to the service scenario to the user based on the information about the service scenario; and
   generating the code analysis algorithm based on a target algorithm feature confirmed by the user in the recommended algorithm feature.

2. The method according to claim 1, wherein the algorithm feature comprises a code analysis feature and a post-processing feature, the code analysis feature represents a type of an analysis policy performed during code analysis, and the post-processing feature represents a type of a post-processing policy that needs to be performed after code analysis.

3. The method according to claim 1, wherein the algorithm feature corresponding to the service scenario is from a preset feature library, and the preset feature library comprises a service scenario and a corresponding algorithm feature.

4. The method according to claim 1, wherein the step of generating the code analysis algorithm based on the target algorithm feature comprises:
   extracting an operator corresponding to the target algorithm feature from a preset algorithm library based on the target algorithm feature confirmed by the user in the recommended algorithm feature; and
   generating the code analysis algorithm based on the extracted operator corresponding to the target algorithm feature.

5. The method according to claim 1, wherein the step of obtaining information about the service scenario comprises:
   obtaining information about multiple service scenarios;
   wherein the step of generating the code analysis algorithm comprises:
   generating multiple code analysis algorithms for each service scenario based on information about each service scenario; and
   wherein the step of analyzing the similarity between the source code and the object code comprises:
   analyzing the similarity between the source code and the object code according to the multiple code analysis algorithms, wherein the analysis result comprises information about a clone pair and information about a service scenario corresponding to the clone pair.

6. The method according to claim 1, wherein the information about the service scenario comprises information on: code source tracing analysis, code plagiarism check, duplicate code identification in a code refactoring scenario, code clone defect identification, and code cluster analysis.

7. A code analysis method performed by a code analysis system, the method comprising:
   providing a code analysis service for a user on a cloud service platform, and the code analysis service runs on a cloud server or a cloud server cluster in a cloud data center;
   obtaining information about a service scenario, wherein the service scenario represents an objective of code analysis;
   generating a code analysis algorithm for the service scenario based on the information about the service scenario;
   recommending an algorithm feature to the user, wherein the algorithm feature corresponds to an operator;
   generating a code analysis algorithm based on a target algorithm feature confirmed by the user in the algorithm feature;
   obtaining information about source code and object code that are specified by the user; and
   analyzing a similarity between the source code and the object code according to the code analysis algorithm, to obtain an analysis result.

8. The method according to claim 7, further comprising:
   obtaining information about a service scenario, wherein the service scenario represents an objective of performing code analysis; and
   wherein the step of recommending the algorithm feature to the user comprises:
   recommending the algorithm feature corresponding to the service scenario to the user based on the information about the service scenario.

9. The method according to claim 7, wherein the algorithm feature comprises a code analysis feature and a post-processing feature, the code analysis feature represents a type of an analysis policy performed during code analysis, and the post-processing feature represents a type of a post-processing policy that needs to be performed after code analysis.

10. A computing device for code analysis, the computing device comprising:
    a memory storing executable instructions; and a processor configured to execute the executable instructions to:
    perform a code analysis by a code analysis service, the code analysis service is provided for a user on a cloud service platform, and the code analysis service runs on the computing device in a cloud data center;

obtain information about a service scenario, wherein the service scenario represents an objective of code analysis; and generate a code analysis algorithm for the service scenario based on the information about the service scenario;

obtain information about source code and object code that are specified by the user;

analyze a similarity between the source code and the object code according to the code analysis algorithm, to obtain an analysis result;

wherein the processor is configured to generate the code analysis algorithm by:

recommending an algorithm feature corresponding to the service scenario to the user based on the information about the service scenario; and generating the code analysis algorithm based on a target algorithm feature confirmed by the user in the recommended algorithm feature.

11. The computing device according to claim 10, wherein the algorithm feature comprises a code analysis feature and a post-processing feature, the code analysis feature represents a type of an analysis policy performed during code analysis, and the post-processing feature represents a type of a post-processing policy that needs to be performed after code analysis.

12. The computing device according to claim 10, wherein the algorithm feature corresponding to the service scenario is from a preset feature library, and the preset feature library comprises a service scenario and a corresponding algorithm feature.

13. The computing device according to claim 10, wherein the processor is configured to generate the code analysis algorithm by:

extracting an operator corresponding to the target algorithm feature from a preset algorithm library based on the target algorithm feature confirmed by the user in the recommended algorithm feature; and generating the code analysis algorithm based on the extracted operator corresponding to the target algorithm feature.

14. A computing device for code analysis, the computing device comprising:

a memory storing executable instructions; and a processor configured to execute the executable instructions to:

perform a code analysis by a code analysis service, the code analysis service is provided for a user on a cloud service platform, and the code analysis service runs on the computing device in a cloud data center;

obtain information about a service scenario, wherein the service scenario represents an objective of code analysis;

generate a code analysis algorithm for the service scenario based on the information about the service scenario;

recommend an algorithm feature to the user, wherein the algorithm feature corresponds to an operator;

generate a code analysis algorithm based on a target algorithm feature confirmed by the user in the algorithm feature;

obtain information about source code and object code that are specified by the user; and analyze a similarity between the source code and the object code according to the code analysis algorithm to obtain an analysis result.

15. The computing device according to claim 14, wherein the processor is further configured to:

obtain information about a service scenario, wherein the service scenario represents an objective of performing code analysis, and wherein the processor is configured to recommend the algorithm feature corresponding to the service scenario to the user based on the information about the service scenario.

16. The computing device according to claim 15, wherein the algorithm feature corresponding to the service scenario is from a preset feature library, and the preset feature library comprises a service scenario and a corresponding algorithm feature.

17. The computing device according to claim 14, wherein the algorithm feature comprises a code analysis feature and a post-processing feature, the code analysis feature represents a type of an analysis policy performed during code analysis, and the post-processing feature represents a type of a post-processing policy that needs to be performed after code analysis.

18. The computing device according to claim 14, wherein the processor is configured to:

extract an operator corresponding to the target algorithm feature from a preset algorithm library based on the target algorithm feature confirmed by the user in the algorithm feature; and generate the code analysis algorithm based on the extracted operator corresponding to the target algorithm feature.

* * * * *